US008052875B2

(12) United States Patent
Oder et al.

(10) Patent No.: US 8,052,875 B2
(45) Date of Patent: *Nov. 8, 2011

(54) APPARATUS AND METHOD FOR CONTINUOUS SEPARATION OF MAGNETIC PARTICLES FROM NON-MAGNETIC FLUIDS

(75) Inventors: Robin R. Oder, Export, PA (US); Russell E. Jamison, Burrell, PA (US)

(73) Assignee: EXPORTech Company, Inc., Export, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/655,634

(22) Filed: Jan. 4, 2010

(65) Prior Publication Data

US 2010/0200511 A1 Aug. 12, 2010

(51) Int. Cl.
*B01D 35/06* (2006.01)
*B03C 1/00* (2006.01)

(52) U.S. Cl. ..... 210/695; 210/222; 210/223; 210/416.1; 210/418; 209/214; 209/223.1

(58) Field of Classification Search .................. 210/695, 210/222, 223, 416.1, 418; 209/214, 223.1; 518/700
See application file for complete search history.

(56) References Cited

U.S. PATENT DOCUMENTS

| | | | | |
|---|---|---|---|---|
| 4,605,678 | A | 8/1986 | Brennan et al. | |
| 5,868,939 | A | 2/1999 | Oder et al. | |
| 6,068,760 | A | 5/2000 | Benham et al. | |
| 7,658,854 | B2 * | 2/2010 | Oder et al. | .................... 210/695 |

FOREIGN PATENT DOCUMENTS

WO WO 03/064052 8/2003

OTHER PUBLICATIONS

R.R. Oder, "High Gradient Magnetic Separation Theory and Applications," IEEE Trans's on Magnetics, vol. MAG-12, No. 5, Sep. 1976, pp. 428-435.

R.R. Oder, C.R. Price, "Brightness Beneficiation . . . Treatment," Tappi, The J. of the Technical Ass'n of the Pulp and Paper Industry, vol. 56, No. 10, Oct. 1973, pp. 75-78.

P.W. Selwood, Adsorption and Collective Paramagnetism, Academic Press, 1962, pp. 52-53.

* cited by examiner

*Primary Examiner* — David A Reifsnyder
(74) *Attorney, Agent, or Firm* — Barbara E. Johnson, Esq.

(57) ABSTRACT

An apparatus and method for continuous separation of magnetic particles from non-magnetic fluids including particular rods, magnetic fields and flow arrangements.

9 Claims, 6 Drawing Sheets

APPARATUS AND METHOD FOR CONTINUOUS SEPARATION OF MAGNETIC PARTICLES FROM NON-MAGNETIC FLUIDS

STATEMENT REGARDING FEDERALLY SPONSORED RESEARCH

This invention was made with Government support under Grant DE-FG02-00ER83008, awarded by the U.S. Department of Energy. The Government has certain rights in this invention.

BACKGROUND OF THE INVENTION

1. Field of the Invention

This invention relates to the art of continuous separation of magnetic particles from a non-magnetic fluid; more specifically it relates to the continuous separation of such types as they pass through a uniform applied magnetic field; and more specifically it relates to the continuous separation of sub-micron size magnetic particles from viscous flows such as the continuous separation of magnetic catalysts from Fischer-Tropsch wax at operating temperature and pressure or separation of particles of wear from transformer oil or spent engine oil and other non-magnetic hydrophobic or hydrophilic liquids.

2. Description of Related Art

U.S. Pat. No. 4,605,678 describes the application of high gradient magnetic separation technology to separation of iron catalysts employed in Fischer-Tropsch synthesis. This batch operated technology, originally developed for separation of very low concentration and weakly magnetic particles from kaolin clay [R. R. Oder and C. R. Price, "Brightness Beneficiation of Kaolin Clays by Magnetic Treatment," TAPPI 56, 75 (1973); R. R. Oder, "High Gradient Magnetic Separation: Theory and Applications," IEEE Transactions on Magnetics, Vol MAG-12, No. 5, pp. 418-425 (September, 1976)] is not well suited to the Fischer-Tropsch application because of the strongly magnetic character of the catalyst particles employed. Additionally, the concentration of these particles in the wax-rich overflow from the reactors employed is so high that the batch process and quasi-continuous versions of it are plugged with the catalyst too rapidly for commercial application. Batch processes, no matter what the nature of the separation mechanism, are not preferred for separating high concentrations of ultra-fine sized particles from high throughput commercial process flows.

U.S. Pat. No. 5,868,939 describes a continuous magnetic separator for breaking emulsions in which a magnetic additive is placed in one phase of the emulsion. The emulsion containing the magnetic additive is made to flow through a vessel containing magnetized rods. As the emulsion flows around the magnetized rods, the magnetic component of the emulsion coalesces and is drawn to the surfaces of the rods by the localized gradient magnetic fields produced by the rods. The magnetic droplets captured by the rods then flow down the surface of the rods to a pool of coalesced material in the bottom of the separator. The two immiscible phases are taken from the separator in separate streams. No means are employed to control the rate of flow of the two streams exiting the coalescer.

WIPO Application No. PCT/US03/02877 describes a continuous magnetic separator for separating magnetic particles from viscous flow in which at least one magnetizable rod is located inside and aligned along the length of a separation chamber to attract magnetic particles from flow around the rods. The rods can be permanent magnets which are magnetized transverse to the rod lengths or can be similarly aligned magnetic rods which are magnetized by an externally applied magnetic field. The magnetic particles are suspended as a slurry in a non-magnetic fluid which enters the chamber between the top where an exit port is located for removing fluid which is low in particle concentration and the bottom of the chamber where an exit port is located for removing a concentrated stream of magnetic particles. The magnetic particles agglomerate by self attraction in the magnetic field surrounding the rods. The agglomerates form chains along the field lines and are attracted to the surfaces of the rods. Fluid flow and gravity drag the chained particles down the rods to the exit port at the bottom of the separation chamber. External means are employed to assure that the greater portion of the mass flow exits the bottom of the separation chamber. The lower ends of the rods and the bottom edge of the magnet generally terminate abruptly at the same elevation in this invention so that there is a large magnetic field gradient at the exit port which tends to hold the magnetic particles inside the separation chamber. This results in a possible buildup of catalyst particles in the bottom of the chamber which can lead to plugging.

U.S. Pat. Nos. 4,605,678 and 5,868,939 and WIPO Application No. PCT/US03/02877 employ the strong field gradients near magnetized surfaces placed in the way of flows containing the magnetic particles to be separated from the flow. While this results in strong magnetic forces for capture, it can also make continuous operation problematical because of the tendency of solid particles to stick and not to release from the magnetized capture surfaces. The invention revealed here overcomes this limitation by use of a separation chamber which contains no magnetic capture elements and which employs means to lessen magnetic forces which would hold the particles in the chamber resulting in plugging.

U.S. Pat. No. 6,068,760, entitled "Catalyst/Wax Separation Device for Slurry Fischer-Tropsch Reactor", reveals a dynamic settler method whereby micron size iron catalyst particles are separated from Fischer-Tropsch wax by a batch process. This method employs jets of slurry impinging on the bottom of a concentric vessel whereby the catalyst particles are said to settle in the bottom of the vessel for return to the Fischer-Tropsch reactor under gravity flow and particle momentum while a wax of low catalyst concentration flows up through the concentric region of the dynamic settler through a wire mesh filter to down stream upgrading. The patent shows catalyst concentrations achieved in test work versus the upward velocity of flow given in cm/h. It shows that a velocity of 5.9 cm/h is required to make a catalyst concentration in the overflow of the dynamic settler of 0.16% catalyst before wire filtration. With a wax density of nominally 0.8 g/cm$^3$, this corresponds to a filtration rate of nominally 0.8 kg/min/m$^2$. Because of this low rate, many dynamic separators must be employed to handle the output of commercial reactors. It is claimed that the added use of the wire filter permits a speed up of the overflow rate, without revealing what the increase in the overflow rate is, but this happens at the expense of sacrificing the continuous nature of the process. The magnetic method which is disclosed in the present application employs no filters of any kind and is not of the concentric nature of U.S. Pat. No. 6,068,760. Further, the method and apparatus of this invention has achieved filtration rates in continuous throughput which are over 60 times greater than that of the dynamic settler at the same catalyst concentration. The throughput limitation of the dynamic settler is impractical because of the high temperature and pressure employed in the Fischer-Tropsch synthesis. The size and number of dynamic settlers alone would make the method cost prohibitive.

SUMMARY OF THE INVENTION

Accordingly, the object of the invention is to provide an improved process and apparatus for true continuous separation of micron and sub-micron sized magnetic particles from flowing non-magnetic viscous fluids at elevated temperature and pressure. The particles can be catalyst particles such as precipitated iron catalyst in Fischer-Tropsch wax or particles of wear such as are found in spent engine oil and other non-magnetic hydrophobic and hydrophilic liquids.

The present invention includes a device and a method for using the device to continually separate magnetic particles from the non-magnetic fluid in which they are slurried. Generally, the particles can be discrete or agglomerates or clusters of particles and can be of very broad particle size and density ranges. Micron sized ferrimagnetic agglomerates containing particles so small that they exhibit superparamagnetism have been separated from viscous diamagnetic fluids at 500° F. using this apparatus and method. The upper and lower bounds of particle size which can be separated by this apparatus are not known at this time. The method is unaffected by pressure and a requirement is that the applied magnetic field be reasonably uniform inside the empty separator chamber and of such strength and so directed that the magnetic particles form stable agglomerates stretched out along the lines of the magnetic field, which agglomerates can be moved by the fluid flow at the process temperature and flow conditions.

A dispersion of magnetic particles in a non-magnetic fluid is passed through an empty chamber made from non-magnetic materials which are located between the poles of a magnet which produces a uniform magnetic field directed transverse to the direction of flow. The connecting tubing, pumps, valves, and separation vessel may be thermally insulated and of such construction as to withstand the pressure and temperature differences between those of the operating system and the ambient environment (e.g., temperatures up to and including 500° F. and pressures up to and including 500 psi). There are no magnetic elements built inside the separation chamber. The separation chamber is empty except for the non-magnetic inlet pipes and the slurry contained therein. The slurry of fluid containing the magnetic particles is released into the chamber from above through downwardly directed inlet ports located against the inside walls of the separation chamber adjacent to the magnet pole faces at an elevation below the top and above the bottom of the chamber. The poles may be so disposed that the lines of the magnetic field are substantially perpendicular to the length of the separation chamber. Exit ports are located at the top and the bottom of the chamber. The magnetic particles, which themselves may be clusters of particles, become magnetized by the externally applied magnetic field as they enter the separation chamber and attract one another to form agglomerates or chains of particles joined end to end strung out along the lines of the magnetic field. For example, the magnetic field is applied transverse to the direction of flow which is along the axis of the separation chamber. The slurry of particles enters the separation chamber as plumes of slurry extending downward along the inside walls of the chamber nearest the magnet poles. The plumes of flow bring the magnetic particles into the separation chamber where they subsequently form chains of agglomerates. The chained particles, in turn, provide a source of intense gradient magnetic fields for capture of additional particles. Simultaneously, the flushing action of the plumes of slurry prevents the chains of magnetic particles from sticking to the inside walls of the separation chamber by sweeping the chained particles downward to the exit port at the bottom of the separation chamber. By this action, the unique apparatus is continuously creating new capture surfaces and retaining fresh particles from flow while simultaneously removing the captured particles. This creates a stream of fluid diminished in particle concentration which, by buoyancy, emerges from the top of the apparatus.

The slurry may be comprised of both magnetic and non-magnetic particles suspended in a non-magnetic fluid. The elevation at which the slurry flow is released into the separation chamber is adjusted so as not to stir up particles which have concentrated in the bottom of the separation chamber where magnetic particles exit the apparatus. Non-magnetic particles and fluid follow the lines of flow and exit at the top and the bottom of the apparatus in relation to the rates of flow. The bottom of the chamber extends below the bottom edge of the magnet return frame and is sloped to a final exit diameter outside of the magnetic field region. This slope is introduced to minimize effects such as frictional drag which would tend to hold the magnetic particles inside the separation chamber. An overflow outlet port is located at the top of the chamber where non-magnetic fluid and some particles flow from the separator. The upper surfaces of the magnet poles terminate abruptly at a distance below the top of the separation chamber for the purpose of creating a field gradient which serves to keep magnetic particles from exiting the top of the separator.

The lower edges of the magnet poles extend to the bottom of the straight section of the separation chamber below the bottom of the magnet iron return frame and are tapered outward. The elongated poles serve to lengthen the flow path through the magnetic field which in turn permits higher rates of feed to the separation chamber without the plumes of slurry disturbing the concentrated magnetic particles located at the bottom of the chamber. Additionally, the outward slope of the poles minimizes the upward directed magnetic force which would hold magnetic particles in the lower regions of the separator and cause plugging.

Flow created by the source, hydrostatic pressure, and/or optional external means, such as a pump, can be employed to force the fluid from the slurry source through the separation chamber. Valves can be employed with the external flow source, hydrostatic pressure, and/or pump to control the rates of high-solids underflow and low-solids overflow, respectively. Depending on the length of the separation chamber and underflow impedance, flow ratios (underflow rate divided by the overflow rate) generally greater than five, provide flows strong enough to sweep the chained particles downward without disrupting the magnetic particles in the bottom of the separation chamber. Flow ratios greater than or equal to ten are especially preferred. The magnetic fields employed need only be large enough to magnetize the particles to a degree which will permit mutual attraction and formation of stable agglomerates. For strongly magnetic particles which exhibit ferromagnetism or other forms of collective magnetism, the magnetic field need only be strong enough to achieve a reasonable degree of magnetic saturation. In the case of separation of nominal 0.4 micron mean-sized agglomerates of 2 to 60 nanometer sized iron catalyst particles with magnetic moments nominally 50-60 emu/g from Fischer-Tropsch wax, nominally 30% of the particles were separated in a magnetic field of 500 gauss while greater than 96% separation of catalysts from the wax product has been achieved in magnetic fields of nominally 1500 gauss. The filtration rate for both cases was between 110 and 130 kg/min/$m^2$. It can be argued from Stokes' Law that the size of particles that can be separated can be reduced and that less magnetic particles, for example, 1 emu/g, and paramagnetic particles can also be separated by employing magnetic fields stronger than 1500 gauss, for example, up to 50,000 gauss. This includes paramagnetic particles and iron, cobalt, and nickel and their compounds.

If the external means is a pump, the configuration of pump and valves is redundant. The pump and the underflow valve can be interchanged. To assure separation it is necessary that flow be forced through the device, that the applied magnetic field is strong enough to magnetize the particles, and that the greater mass flow exits the bottom of the separator.

The high-solids slurry exiting the bottom of the separation chamber may be returned to the slurry source, if appropriate.

Likewise, the low-solids slurry exiting the top of the separation chamber through an overflow valve, may be subjected to additional separation employing this or other means such as cross-flow filtration, barrier filtration, electrostatic separation, sedimentation, centrifugation, or other magnetic means such as High Gradient Magnetic separation. In a similar manner, the low-solids slurry exiting the top of the separator may be returned to the slurry source if appropriate.

This apparatus has been found to be especially useful in true continuous separation of micron sized particles and especially sub-micron sized iron catalyst particles from Fischer-Tropsch wax at elevated temperatures. Magnetic fields of 1500-2000 gauss are sufficient to separate submicron size precipitated iron catalyst particles from Fischer-Tropsch wax at 500° F. This method is capable of separating 20-25 wt. % concentration sub-micron sized iron catalyst to produce a Fischer-Tropsch wax concentrate with catalyst concentration in the 0.1-0.5 wt. % range on a continuous basis at throughputs much greater than can be achieved by sedimentation or filtration. When high gradient magnetic separation is employed as a second stage of separation, diamagnetic wax slurries with particle concentrations in the 0.01-0.05 wt. % range have been prepared.

The unexpected finding and great benefit of this technology is that flows containing high concentration of magnetic particles in which the particles are of a very broad size range can be efficiently separated in a true continuous mode of operation. Further, the throughputs achievable with this method are much higher than possible with conventional sedimentation or filtration so that the separation apparatus can be kept small by comparison. This is advantageous where high temperature and high pressure are involved as is the case in commercial separation of magnetic catalysts from Fischer-Tropsch wax and especially if the separator were to be located inside the reactor.

These and other advantages of the present invention will be understood from the description of the desirable embodiments, taken with the accompanying drawings, wherein like reference numbers represent like elements throughout.

DESCRIPTION OF THE PREFERRED EMBODIMENTS

Figure 1:
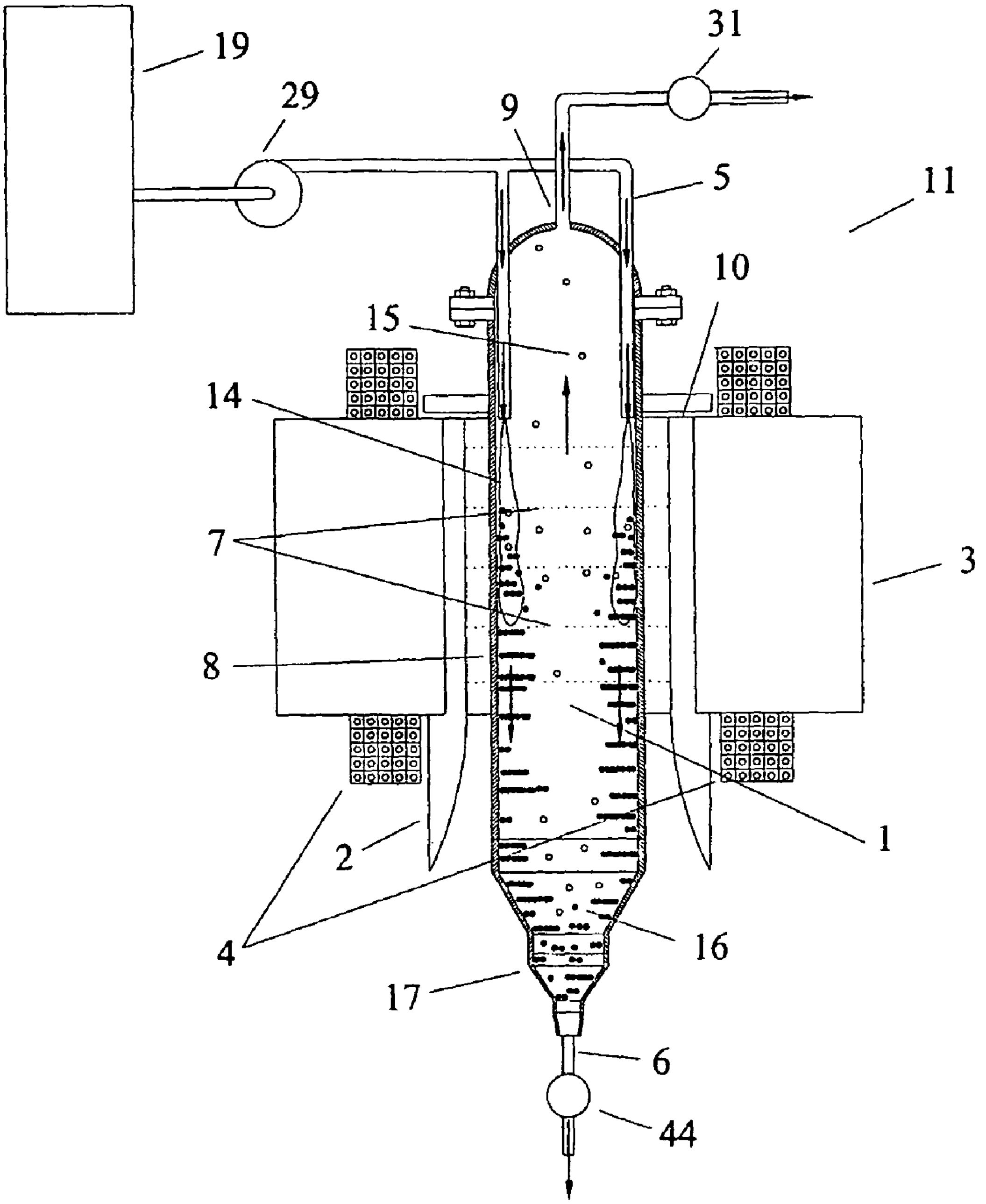
FIG. 1 is a front cutaway view of a continuous magnetic separator in accordance with the present invention.
Figure 2:
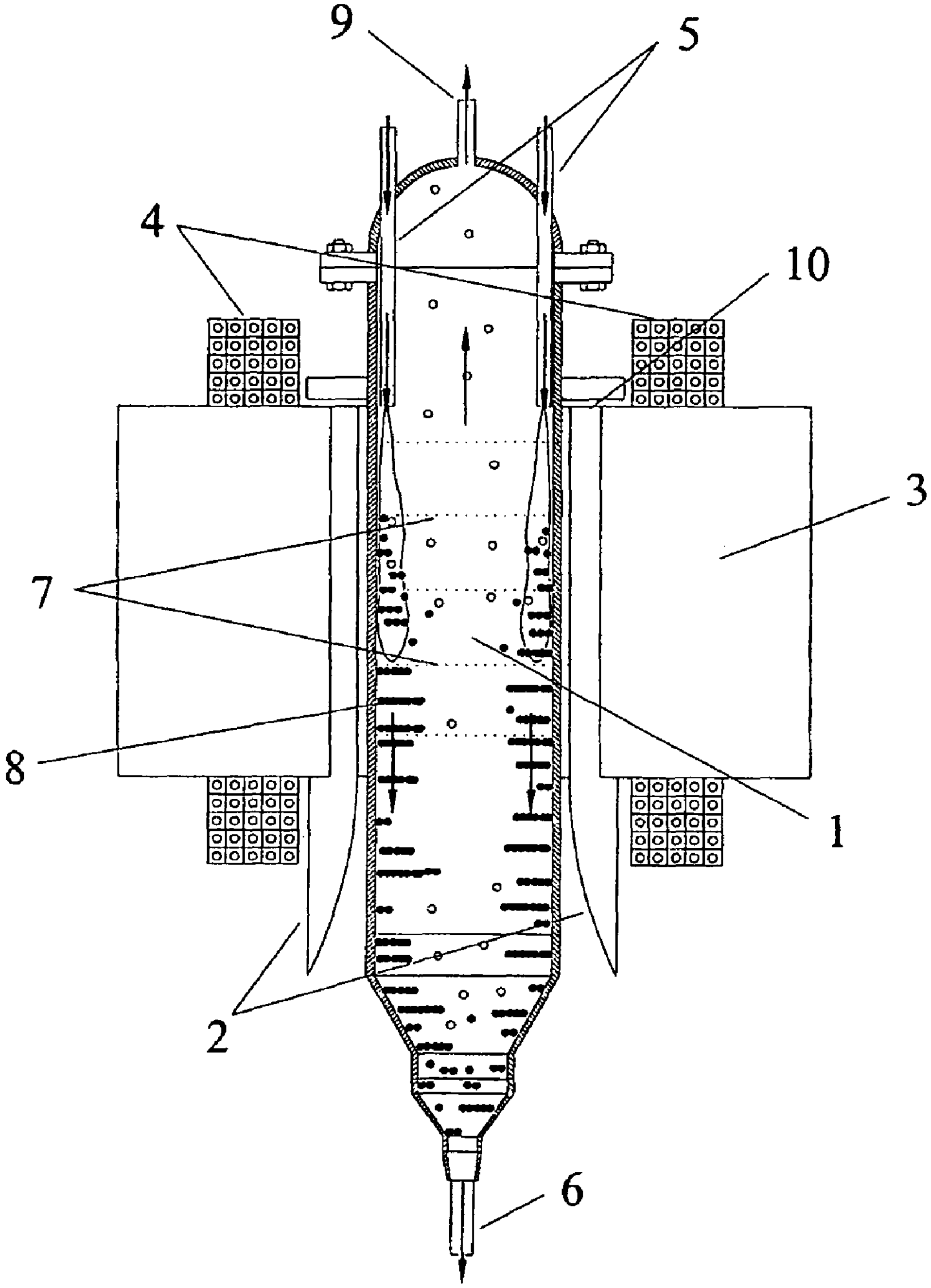
FIG. 2 is a front cutaway view of the separation vessel of the continuous magnetic separator of FIG. 1.

A preferred embodiment of the separation vessel and accompanying hardware and equipment is shown in FIGS. 1 and 2. The separation vessel is shown a vertical section through the midplane of the separator wherein the separation chamber is an elongated empty vessel 1 oriented generally vertically and housed between poles 2 of an electromagnet 3. Magnet coils 4 form loops around the magnet poles and rise vertically behind and in front of the vessel out of the plane of the drawing. The magnetic field thus generated is in a horizontal plane transverse to the length of the separation vessel shown in FIG. 2.

Flow is introduced in a downward direction from the top of the vessel as high velocity streams through dual inlet ports 5 located opposite one another against the inside walls of the separation chamber adjacent to the magnet pole faces. The inlet on each side of the vessel can be a single pipe, multiple pipes, or have orifices designed to flush the inside surfaces of the separation vessel adjacent to the magnet poles. The elevation of these inlets into the separation vessel can be arranged to prevent excessive mixing in the bottom of the separation vessel caused by the plumes of slurry introduced through the inlet ports. Means such as pump 29 can be used on the feed line to the inlet ports 5 or the underflow port at 6 to force the flow; however, any source of driving pressure could be used to generate the flow. Driving means which have minimal effects on particle attrition and wear are preferred.

As the particle/fluid mixture enters the magnetic field region, the particles become magnetized by an externally applied homogeneous magnetic field 7. This in turn induces highly non-uniform localized magnetic fields near the induced poles of the magnetic particles, which become aligned substantially parallel to the lines of the applied magnetic field. Because of the non-uniform localized magnetic fields near the induced poles of the particles, there is a strong attractive magnetic force between particles tending to bring the particles together with the north pole of one particle attracted to south pole of the other. Thus, magnetic particles entering the magnetic field region will agglomerate, forming chains 8 extending along the lines of the magnetic field generally emanating from the regions of the separation vessel nearest the magnetic poles. In this fashion, the magnetic particles come together and squeeze out the carrier fluid. These chains may or may not extend all the way across the width of the separation vessel 1.

Magnetic particles carried into the cell by the downward directed flow will be attached to the chains if fluid flow brings them within the range of the gradient fields. The rate of fluid flow is adjusted so that, working with gravity, the chains of particles are made to move down the inside walls of the separation vessel, thus preventing sticking which would lead to plugging, without stirring up the particles in the bottom of the separation vessel which would lead to excessive amounts of unchained particles or short chains of particles being inadvertently carried upward by the exiting fluid flow toward an overflow outlet 9. A slurry of concentrated particles is withdrawn from the bottom of the vessel through underflow port 6. The outlet at the bottom of the chamber must be sufficiently open so that the concentration of particles accumulating there does not become so high that the slurry can no longer be pumped because of high viscosity.

Figure 3:
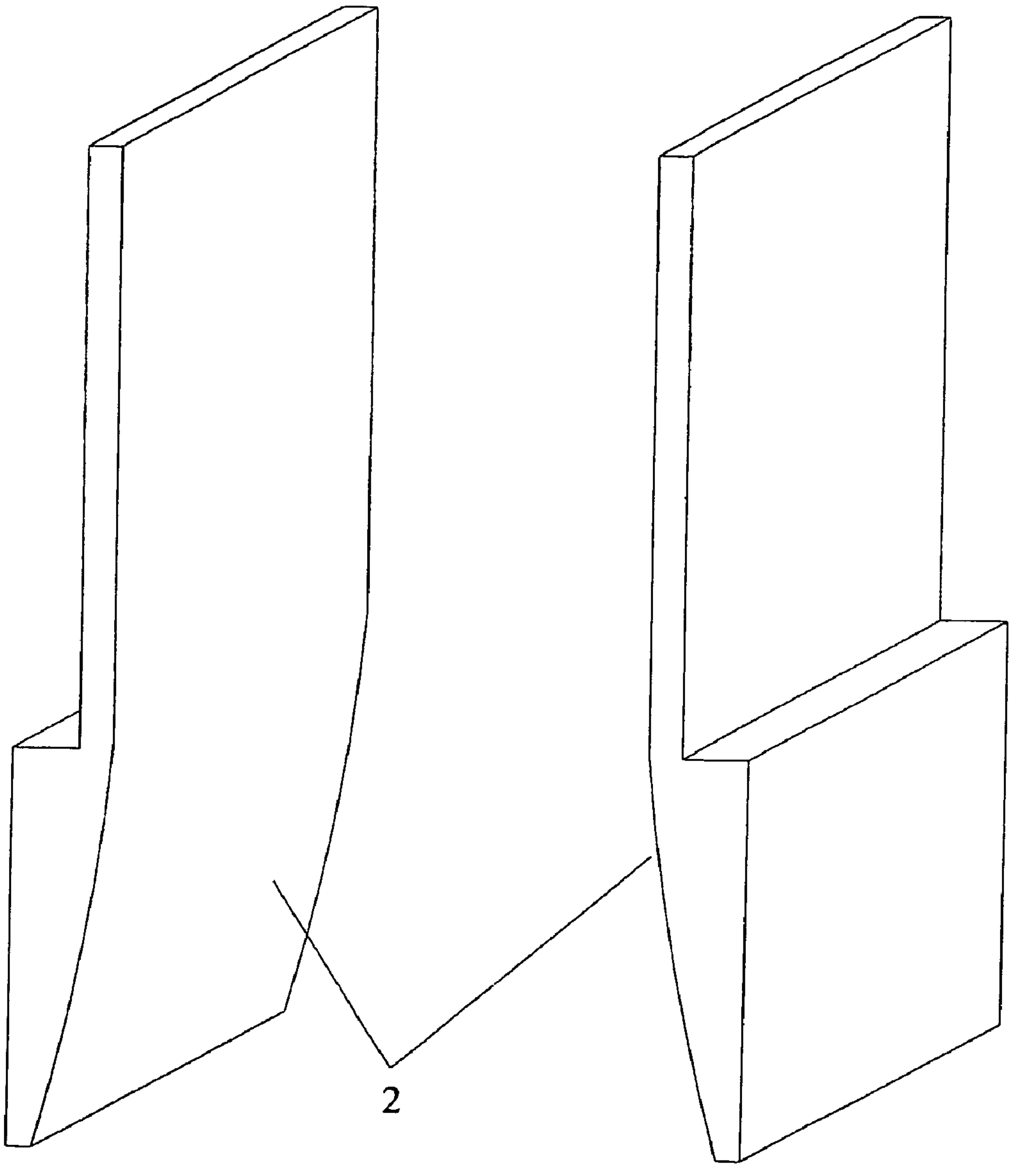
FIG. 3 is a front perspective view of magnet poles of the magnetic separator of FIG. 1.

The magnet poles 2, shown in perspective view in FIG. 3, extend below the bottom of the magnet frame and are curved outward to slowly increase the local magnet pole opening as one proceeds along the vertical direction down away from the bottom of the magnet. This lowers the strength of the magnetic field in the region of the bottom of the separation vessel and reduces the vertical component of the magnetic field gradient which in turn reduces the upward directed magnetic force which tends to keep the magnetic particles in the separation vessel thus causing plugging. Additionally, lengthening the magnet poles as described above allows for a longer slurry plume extending downward from the inlet ports without disrupting the concentrated particles exiting the bottom of the separation vessel. This permits increased flow into the separation vessel thus increasing the system throughput without sacrificing separation efficiency. With these improvements, withdrawal of magnetic particles from the underflow exit is limited more by the solids concentration which can be made to flow under the pressure differential across the separation vessel than it is by spurious magnetic forces. Conversely, while the pole length can be extended to above the top of the magnet flux return frame by a similar pole design, thus extending the length of plume in the separation vessel, and hence allowing greater throughput, the upper edge of an electromagnet pole 10 however, is abruptly terminated below the overflow outlet 9 at the top of the separation vessel. This results in a vertical component of the magnetic field gradient at the top of the magnet which is directed downward into the separation vessel. This helps to keep magnetic particles from exiting at the top.

Efficient separation of particles and fluid is achieved using this novel continuous separator when a slurry source means such as a Fischer-Tropsch synthesis reactor, feed pump, or hydrostatic pressure are employed to force the chains downward along the separation vessel inside walls, and means are employed to constrain the rate of overflow to be less than the rate of the underflow.

Figure 4:
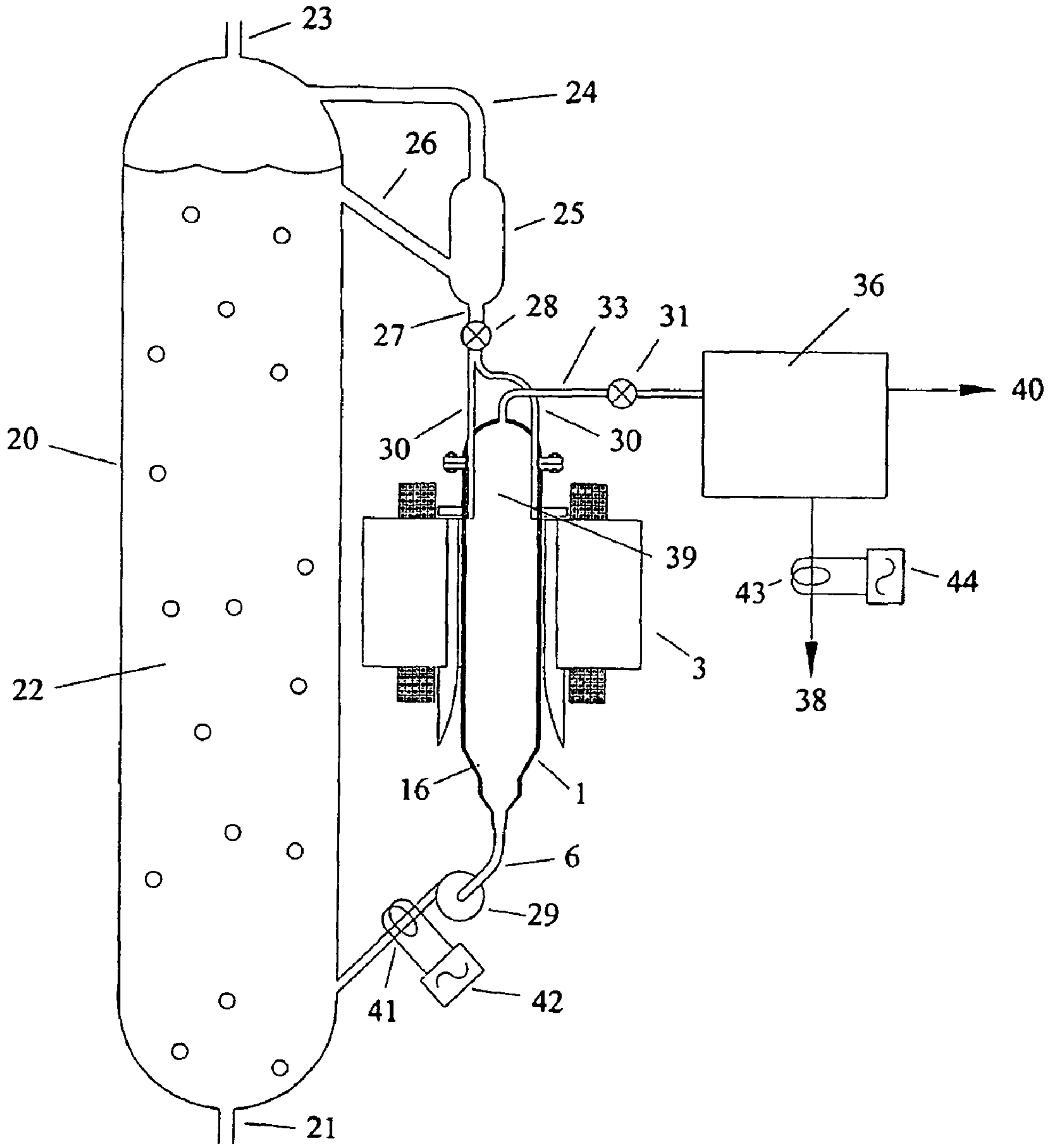
FIG. 4 is a front cutaway view of a preferred embodiment of the present invention as applied to Fischer-Tropsch synthesis.

FIG. 4 is a flow diagram of one preferred embodiment of the invention. In the figure, a Fischer-Tropsch reactor 20 with a slurry zone 22 contains a mixture of liquid comprising waxes made in the reactor, gases, and solid magnetic catalyst particles. Synthesis gas comprising hydrogen and carbon monoxide is added at the bottom of the reactor at line 21. Vapors are removed from the reactor through line 23. Slurry is drawn from the slurry zone 22 through line 26 into a vapor liquid separator 25. Vapors are returned through line 24. The slurry flows through line 27 and then through optional valve 28 into the slurry inlet ports 5 of the continuous magnetic separation vessel 1 which is magnetized by electromagnet 3. The magnetic particles in the slurry proceed to agglomerate and chain in the applied magnetic field and then, under influence of the flow and gravity forces, move down the walls of the separation vessel. The particles separated from the slurry form a magnetic concentrate 16 at the bottom of the continuous separator. The magnetic concentrate exits through underflow port 6 to the inlet of optional pump 29 from where it flows back into the reactor to recycle the catalyst particles. The exit stream is shown passing through a demagnetizing coil 41 which is energized through a power supply 42. The coil and supply are of the type supplied by R. B. Annis Co., Inc., Indianapolis, Ind., and can be purchased from McMaster Carr Supply Company of Cleveland, Ohio. The demagnetization operation is optional. It can be employed if desired to break up magnetic agglomerates for catalyst particles which exhibit hysteresis with a large remnant magnetization. Otherwise it is unnecessary. A clarified liquid forms from the slurry with the magnetic particles removed at the top of the continuous magnetic separator. The clarified liquid exits through line 33 and then through valve 31 to a secondary separator 36 wherefrom a further clarified liquid is withdrawn through line 40 and additional magnetic particles are withdrawn through fine 38. The exit stream from separator 36 passes through optional demagnetization coil 43 which is energized by a power supply 44. A preferred secondary separator is an additional separator of the type described here or a high gradient magnetic separator, though other filters may be used as well. Note that the secondary separator 36 is shown as a conceptual block and the feed and product arrows are not indicative that the process conducted therein is a continuous process. It is not as important that this process step be continuous since it is not integrated into the synthesis process.

Operation of the separation vessel 1 shown in FIG. 4 is redundant. In the figure, operation of the separation vessel 1 is controlled by optional inlet valve 28, overflow valve 31, and optional slurry pump 29. Flow restrictors, such as valves or pipe orifices, and pumps are an integral part of this invention and are required for control of its operation. However, in most cases control devices are not necessary on all three connections to the separator, feed, overflow, and underflow. The valve 28 may be required to keep a constant slurry level in the reactor 20. Otherwise, it is not needed. Any two control devices can be used and in the special case where flow from the column reactor is reasonably steady and sufficient to force flow through the separator, and the weight of the column of underflow from the separator is sufficient to cause it to flow back into the reactor 20 only one overflow valve 31 is required. In this case pump 29 is unnecessary. In some cases, two controls may be used, one on the overflow and one on the underflow to assure the greater part of the flow exits the underflow port 6. The valve 31 is primarily used to control the recycle ratio R, which is the ratio of the underflow rate to that of the overflow. The separator can be operated with recycle ratios greater than or equal to 5 to 10 and preferably greater than or equal to 10.

For the case where iron catalysts which are sensitive to the decrepitating action of pumps and valves are being employed, one can use a control valve in the overflow outlet and a restricted pipe diameter from the underflow port 6 to control the flows. The underflow pipe diameter, however, must be large enough to permit flow of a high solids slurry. The maximum solids level that will flow will depend upon the concentration of catalyst particles in the wax stream. A solids concentration of 25-35 wt % is a reasonable, although not a limiting, upper value of solids for pumping Fischer-Tropsch slurries containing precipitated iron catalyst. The catalyst particles in the overflow line 33 are generally of smaller particle size than those flowing through the underflow port 6. With this configuration of controls, the effects of particle sized diminution are minimized, especially if the fine particles are not to be returned to the column reactor. Fines do not present a problem from the point of view of separation from high temperature and pressure viscous flow, however, with use of this technology. Micron sized agglomerates of catalyst particles, each particle of which has size consist between 2 and 60 nm, have been separated from Fischer-Tropsch wax at 500° F. by this method. These agglomerated particles can be returned to the reactor or discarded as is required in the process application.

Figure 5:
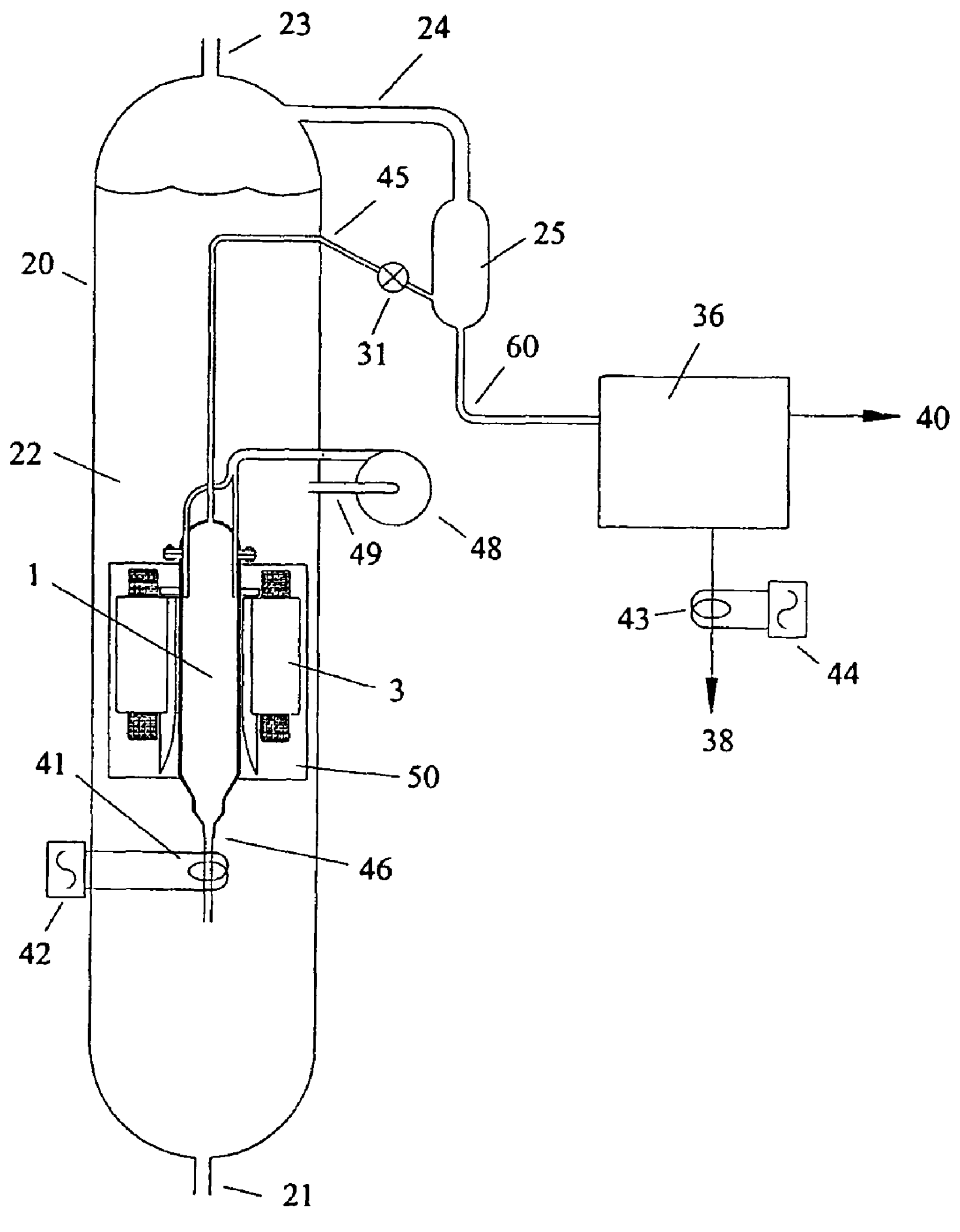
FIG. 5 is a front cutaway view of an alternate embodiment of the present invention as applied to Fischer-Tropsch synthesis, wherein the separator is located inside a reactor.

In another preferred embodiment shown in FIG. 5, the separation vessel 1 and electromagnet 3 are located within the reactor slurry zone 22 of a Fischer-Tropsch reactor 20 so that the clarified liquid is removed from the slurry zone through an outlet from the reactor 20 and the magnetic concentrate slurry is returned to the reactor slurry zone 22 through a separator outlet line 46 preferably at a position near the bottom of the slurry zone 22. In this embodiment the slurry is preferably continuously pumped into the slurry inlet by a pump 48 that draws slurry from the reactor slurry zone. The pump may be of the type that is internal to the reactor, such as a canned pump, or may be outside of the reactor drawing slurry through a nozzle 49 extending through the reactor wall. In this case the split between the separator overflow exiting at reactor outlet 45 and underflow exiting at separator outlet line 46 is preferably controlled by control valve 31 and a flow restrictor on the separator outlet line 46 or flow restrictors on both the reactor outlet 45 and the separator outlet line 46 or both. The exit stream at separator outlet line 46 is shown passing through demagnetizing coil 41 which is energized through power supply 42. The coil and supply are of the type described earlier. The demagnetization operation is optional. It can be employed if desired to break up magnetic agglomerates for catalyst particles which exhibit hysteresis with a large remnant magnetization. Otherwise it is unnecessary.

A clarified liquid forms when the magnetic particles coalesce and moves to the top of the separator. The clarified liquid exits through line 45 and then through valve 31 to vapor liquid separator 25. Gas separated from the clarified liquid moves through line 24 and exits from the top of the reactor through line 23. The gas-free clarified liquid moves through line 60 to secondary separator 36 wherefrom a further clarified liquid is withdrawn through line 40 and additional particles are withdrawn through line 38. The line 38 from separator 36 passes through optional demagnetization coil 43 which is energized by power supply 44. A preferred secondary separator is an additional separator of the type described here or a high gradient magnetic separator, though other filters may be used as well. Note that the secondary separator 36 is shown as a conceptual block and the feed and product arrows are not indicative that the process conducted therein is a continuous process. It is not important that this process step be continuous since it is not integrated into the synthesis process.

In this preferred embodiment with the continuous magnetic separator within the reactor, it is preferred that the coils, iron return frame, and magnet poles be thermally isolated from the surrounding liquid by means 50. It is further preferred to use a superconducting magnet, because of the large working gap required by thermal isolation. Use of large-scale high temperature superconductors would substantially reduce the cost of this option.

Figure 6:
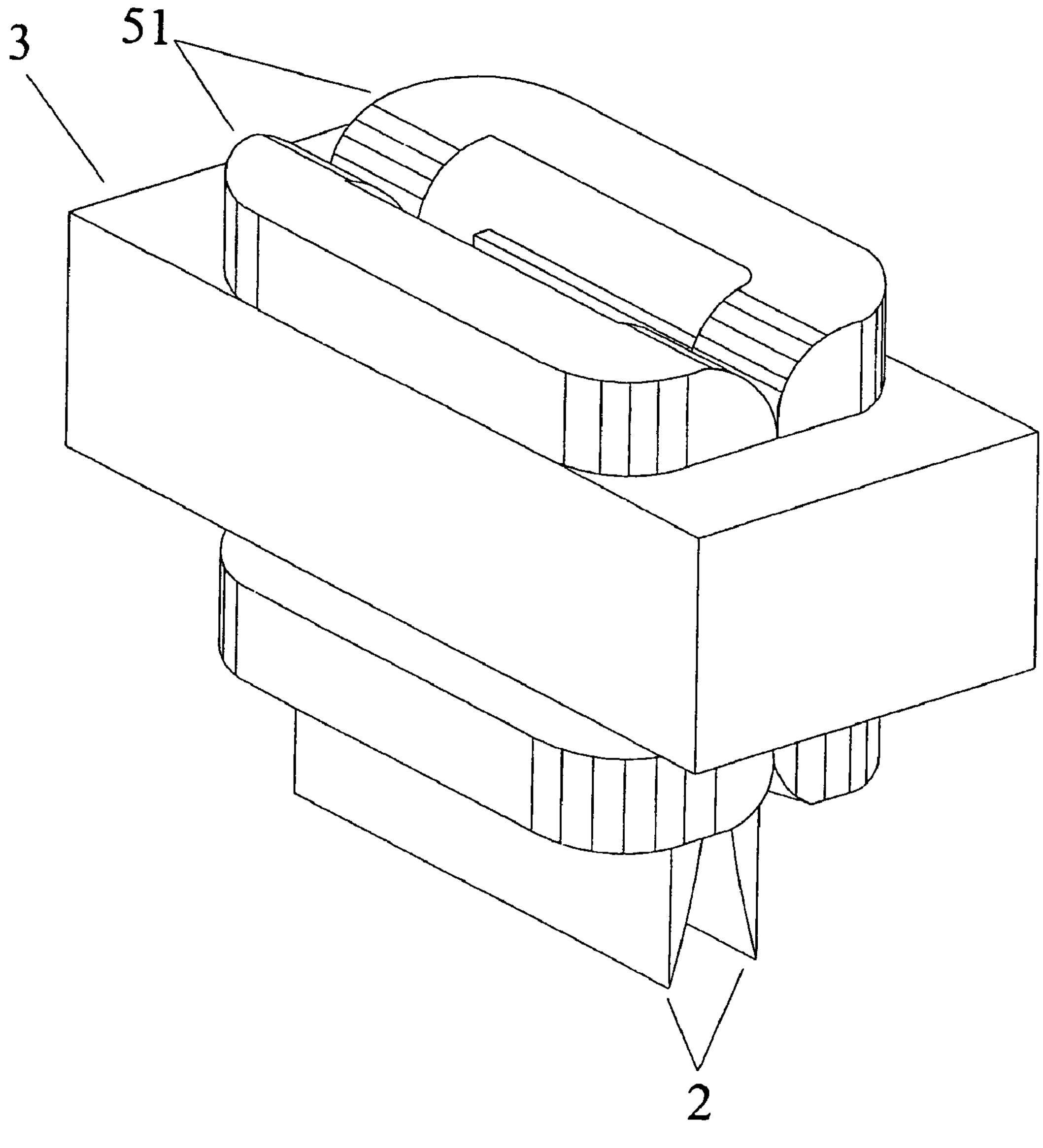
FIG. 6 is a front perspective view of a transverse field electromagnet.

The continuous magnetic separator shown in FIGS. 4 and 5 is of the type shown in FIGS. 1 and 2 where the magnet could be an electromagnet, a superconducting magnet, or a permanent magnet. The electromagnet structure shown in FIGS. 1 and 2 is a conventional iron frame electromagnet of the type pictured on page 53 of the book entitled "Adsorption and Collective Paramagnetism" by Pierce W. Selwood and published by Academic Press, New York, 1962, except that the pole gap in the research magnet illustrated in Selwood is much smaller than that anticipated for magnetic particle separation envisioned here. If it is desirable to employ a more uniform magnetic field than that possible with the conventional transverse access magnet of the type shown in Selwood, then a magnet of the type shown in FIG. 6 can be employed. In FIG. 6, magnet coil windings 51 can be wound so as to pass up through the pole gap on either side of the poles and be folded over at the top and bottom surfaces of the electromagnet 3 so as to permit transverse access to the working volume.

While the reactor and reaction system have been described in terms of a Fischer-Tropsch reactor, the invention could just as well be another reaction carried out in a slurry comprising a non-magnetic liquid and a strongly magnetic solid slurried therein. Additionally, the separator may be employed in different applications such as when the low solids overflow exiting from the separation vessel 1 at overflow port 9 is to be recycled to the source 19. While not limiting, examples of such applications would be clean-up of used engine oils or transformer oils.

The need for a secondary separator depends solely on the way that the product of the first stage separator will be used. In some cases, the product made from the continuous magnetic separator may not need to be processed through a secondary separator.

A separator of the type described in this invention is highly preferable when using iron catalyst in the Fischer-Tropsch reactor. In the reactor, the iron oxide reacts with carbon monoxide and hydrogen to produce surface layers of iron carbide which fractures the catalyst particle structure. This in turn causes minute catalyst particles to slough off the catalyst agglomerate surface leading to sub-micron sized particles which must be removed from the wax downstream of the Fischer-Tropsch reactor. It is well-known that separation of sub-micron sized particles is very difficult by sedimentation means and that large concentrations of small particles tend to blanket conventional filters making operation with iron catalysts very problematical. Iron is a desirable catalyst when processing synthesis gas produced by gasification of coal, petroleum coke, or other materials with low ratios of hydrogen to carbon. Further, iron is less costly and more easily disposed than is cobalt, another magnetic material of choice in the Fischer-Tropsch synthesis.

The novel magnetic separator is capable of separating agglomerates of nanometer iron catalyst particles with a very broad range of magnetic moments and agglomerate sizes. In unoptimized experiments, 1-100 micron-sized magnetite catalyst agglomerates composed of nanometer sized magnetite particles with magnetic moments of the order of 50 emu/g and sizes of the order of 10 microns have been separated from diamagnetic slurry with kinematic viscosities up to 600 cS at filtration rates in the order of 200 kg/min/m$^2$. Individual particles which were agglomerated in the field ranged from 2 nm to 60 nm. Similar iron particles with magnetic moments of 213 emu/g could be separated as well. If the filtration rate is lowered, then the sizes and magnetic moments at which magnetic particles can be separated from the diamagnetic fluid decrease.

The following tests have been performed to illustrate operation of the novel separator.

Test Procedure

A Model HD-70A lobe pump manufactured by The Pump Division of Tuthill Corporation, 12500 South Pulaski Road, Chicago, Ill. 60658 was used to pump a slurry of Fischer-Tropsch wax at 500° F. containing iron catalyst particles through a continuous magnetic separator of the type shown in FIG. 1. Pipe connections and sampling ports were employed such that the overflow and underflow streams could be sampled independently and the flows recycled to the source.

The test material had been taken from an operating Fischer-Tropsch synthesis reactor. The slurry material used in testing contained up to 35 wt. % iron catalyst particles. Portions of the catalyst particles had been converted to iron carbides upon exposure to carbon monoxide and hydrogen in the Fischer-Tropsch reactor. The individual particle size ranged from 2 to greater than 60 nm. Cluster sizes ranged from sub-micron to nominally 100 microns. The kinematic viscosity of the slurries ranged from less than 1 cS to greater than 600 cS for solids ranging from 0.5 to 35 wt. % at nominal 500° F. A Brookfield viscometer was employed to measure the viscosity. Slurry density was calculated from mass and volume measurements made at 500° F.

The separation vessels were thermally insulated and housed within the pole gap of an electromagnet which produced a magnetic field oriented in the horizontal plane transverse to the length of the separation vessel. The pole gap volume had a parallelepipedal shape. It was 10 inches wide and had a maximum pole gap of 9¼ inches when used with a thermally insulated 6-inch inside diameter chamber and three and 3¾ inches when used with a thermally insulated 2-inch inside diameter chamber. The magnet iron return frame extended 9 inches along the length of the canister. The maximum magnetic field was 2200 gauss for the nominal 6-inch chamber and 7700 gauss for the nominal 2-inch canister.

In order to lessen mixing and to avoid plugging in the separator the magnet poles were extended below the bottom of the iron return frame and were shaped to facilitate a smaller vertical component of the magnetic field gradient there. To accomplish this, magnet poles were fabricated to gradually curve away from one another as shown in FIG. 3. This reduced the magnetic field gradients at the lower edge of the magnet return frame by approximately 90% and lowered the tendency for plugging. This also improved the operation of the separator by effectively lengthening the separation vessel. Use of the extended poles also serves to improve the homogeneity of the magnetic field inside the separation chamber by effectively improving the ratio of the core length along the canister to the gap opening and width.

The total length of the separation vessel from the domed top to the outlet at the tapered bottom depends upon the vessel diameter and the fittings used to terminate the bottom. With nominal ¾-inch pipe fitting on the bottom of the 6-inch diameter chamber, the overall length of the vessel is approximately 28 inches. It is to be understood that the separation vessel may assume various dimensions including but not limited to, substantially elongate cylindrical or parallelepipedal shapes. Additionally, the cross section of the top portion of the separation chamber may be greater than a cross section of the elongate portion. Furthermore, the cross section of the elongate portion may be greater than a cross section of the bottom portion.

Tests employing a transparent cell at room temperature in which nominal 34 micron diameter magnetite particles were added to water showed that the magnetite particles would cluster into fingers outward from the nearest pole across the cell and remain suspended 3 inches above the bottom of the iron frame when the squared-off poles were in place. This is slightly above the location of the maximum of the vertical component of the magnetic field gradient created by the bottom edge of the poles. At fields below 200 gauss, the magnetite would fall out of the field. At higher field strengths, the magnetite concentration increased at elevations above the maximum in the gradient leading to plugging of the separator. A small amount of magnetite also remained near the top of the poles fingering out from the pole faces. Tests with the squared poles also demonstrated that the higher the field strength, the less magnetite was released from the separator to the underflow. Above 200 gauss, no magnetite was released in the squared pole apparatus. Tests with the transparent cell showed that the magnetite released at 300 gauss when the new sloped poles were installed, demonstrating that release was improved with the sloped poles.

EXAMPLE 1

Typical Experiment

A slurry containing 21.45 wt. % catalyst was fed at the rate of 17.53 gpm into a 6-inch diameter separation vessel through two sets of down-directed feed lines located across from one another next to the elongated tapered poles of the electromagnet. A vessel with a 6-inch inside diameter was employed. The overall canister length was 21 inches from the top of the dome at the overflow port to the bottom of the straight section which terminated 5 inches below the bottom of the magnet return frame. The volume of the six inch canister is 10 liters. Each set of feed lines consisted of one ¾-inch outer diameter tube and two ½-inch tubes on either side of the ¾-inch inlet. The magnetic field was 2000 gauss. The underflow was withdrawn through a 2-inch pipe (nominal 2.067 inch inner diameter) at a rate of 16.1 gpm and contained 23.33 wt. % ash. The overflow was withdrawn through a ½-inch tube with 0.035-inch wall thickness at the rate of 1.43 gpm and contained 0.35 wt. % ash. The ash level in the overflow was 98.4% less than that in the feed.

The residence time in the apparatus was 11 seconds. The total process flow during the 2 hour run had a volume equal to 660 times that of the empty separation chamber. Thus, a volume equal to 660 times that of the chamber was processed without signs of plugging.

Assuming the density of the wax to be 0.78 g/cm$^3$, the overflow filtration rate obtained by the above example is 182 kg/min/m$^2$. This is 50 times greater than the filtration rate projected for the continuous dynamic settler described in U.S. Pat. No. 6,068,760 at a catalyst concentration of 0.35 wt %.

EXAMPLE 2

Magnetic Field Effects

The slurry was fed at an average rate of 11.3 gpm to a 6 inch diameter vessel through two ¾-inch outside diameter down-directed stainless pipes located next to the inside walls of the separation chamber adjacent to the magnet poles as described above. The pipe outlets open into the separation chamber at an elevation which is 3 inches below the top of the electromagnet return frame. The opening at the chamber overflow was ½-inch tubing; the opening at the underflow was nominally 1-inch pipe. The magnetic field strength was varied from the locked-in field of the electromagnet with no current in the energizing coils up to 2200 gauss. Valves were used to maintain a recycle ratio of approximately 11:12. The ash levels in the feed, underflow, and the overflow were measured. The percentage reduction in ash was calculated as % reduction=[(ash in feed−ash in overflow)/ash in feed]*100.

Results are given versus the applied magnetic field in Table I.

TABLE I

Effect of Magnetic Field on Separation of Iron Catalyst Particles from Fischer-Tropsch Wax at 445° F.

| Magnetic Field (gauss) | Feed Rate (gpm) | Feed Ash (wt %) | Recycle Ratio | Overflow Ash (wt %) | Ash Reduction |
|---|---|---|---|---|---|
| 0 | 11.6 | 19.88 | 12.1 | 19.67 | 1.1 |
| 500 | 11.3 | 19.03 | 11.9 | 12.88 | 32.3 |
| 1000 | 11.3 | 19.00 | 12.0 | 6.41 | 66.3 |
| 1500 | 10.9 | 18.47 | 11.3 | 0.68 | 96.3 |
| 2000 | 11.2 | 18.95 | 11.4 | 0.58 | 96.9 |

The applied magnetic field has a major effect on the separation process. The field should be sufficient to saturate the magnetism of the particles to be separated if they exhibit collective magnetism, i.e., they exhibit hysteresis. The iron catalyst particles were found to be saturated at fields between 1500 and 2000 gauss. The separator performance reflects the saturation magnetization of the iron particles in the Fischer-Tropsch wax.

EXAMPLE 3

Flow Entrance Effects

The direction in which the slurry is introduced into the separation vessel is important. This is illustrated with measurements made using a 2-inch diameter separation vessel and shown in Table II. All measurements were made at 1000 gauss magnetic field strength.

TABLE II

| Effects of Flow Entry Direction | Overflow | | Underflow | | Feed | | | |
|---|---|---|---|---|---|---|---|---|
| | Flow Rate (gpm) | Ash (wt %) | Flow Rate (gpm) | Ash (wt %) | Flow Rate (gpm) | Ash (wt %) | Recycle Ratio | Ash Reduction (wt %) |
| Tangential | 0.012 | 0.97 | 0.174 | 21.38 | 0.19 | 20.03 | 14.1 | 95.1 |
| Tangential | 0.006 | 0.94 | 0.182 | 19.87 | 0.19 | 19.26 | 30.3 | 95.1 |
| Down-Directed | 0.041 | 0.94 | 0.258 | 22.18 | 0.30 | 19.30 | 6.4 | 95.2 |
| Down-Directed | 0.040 | 0.86 | 0.314 | 20.72 | 0.35 | 18.48 | 8.0 | 95.4 |

Two flow configurations are shown, tangential and down-directed. In the tangential case, one ¼-inch inner diameter entry port is employed. It is located 3 inches above the bottom of the iron return frame of the electromagnet and makes a tangential entry into the separation vessel at 90 degrees with respect to the electromagnet poles. For the two down-directed cases, the flow enters the separation vessel through ¼-inch inner diameter tubing at an elevation which is 3 inches below the top of the electromagnet iron frame for both cases. For the down-directed case, there are two ¼-inch inner diameter tubes, each located opposite one another against the inside wall of the vessel adjacent to the magnet poles.

This is apparent in the elements of Table II that by using the down-directed configuration a substantial increase in the feed and overflow rates can be achieved without sacrificing performance in particle separation. Indeed, tangential entry requires recycle ratios of 14 and greater at 1000 gauss operation while recycle ratios as low as 6.4 were capable of achieving substantially the same result for the down flow configuration. The recycle ratio is the ratio of the rate of underflow to the rate of overflow. High feed rate and low recycle ratio is beneficial in making the method practical.

EXAMPLE 4

Flow Entrance Elevation Effects

The slurry was fed at an average rate of 11.3 gpm to a 6-inch diameter vessel through two ¾-inch outside diameter down-directed stainless pipes as described above. The feed pipe outlets open into the separation chamber at various elevations ranging from 3 inches above the top of the iron return frame to 6 inches below. The opening at the chamber underflow was nominally 1 inch diameter. The applied magnetic field strength was held constant at 2000 gauss. Overflow and underflow valves were used to maintain a recycle ratio of approximately 10 to 11. The ash levels and flow rates in the feed, underflow, and the overflow were measured. The percentage reduction in ash was calculated as described above. Results are given versus the feed outlet elevation in Table III.

TABLE III

Effect of Flow Entrance Elevation on Ash Reduction

| Injection Depth (inches) | Overflow Flow Rate (gpm) | Overflow Ash (wt %) | Underflow Flow Rate (GPM) | Underflow Ash (wt %) | Feed Flow Rate (gpm) | Feed Ash (wt %) | Recycle Ratio | Ash Reduction (wt %) |
|---|---|---|---|---|---|---|---|---|
| 3 | 1.118 | 1.37 | 11.04 | 20.23 | 12.16 | 18.49 | 9.9 | 92.6 |
| 0 | 0.955 | 0.45 | 9.84 | 20.22 | 10.8 | 18.46 | 10.3 | 97.5 |
| −3 | 0.901 | 0.58 | 10.25 | 20.57 | 11.15 | 18.95 | 11.4 | 96.9 |
| −6 | 0.883 | 8.12 | 10.24 | 17.73 | 11.12 | 16.97 | 11.6 | 52.1 |
| | | | | Average | 11.3 | 18.2 | 10.8 | |
| | | | | StDev | 0.6 | 0.9 | 0.8 | |

The best elevation for entrance of the slurry into the separator can be seen to be at or near the top of the electromagnet iron return frame. In this case the plume of slurry is released in the magnetic field and the presence of the plume does not have a detrimental effect on the ash level in the overflow stream. As the plume is released at more than 3 inches below the top of the magnet return frame, the separator performance drops rapidly.

The invention has been described with reference to the desirable embodiments. Obvious modifications and alterations will occur to others upon reading and understanding the preceding detailed description. It is intended that the invention be construed as including all such modifications and alterations insofar as they come within the scope of the appended claims or the equivalents thereof.

The invention claimed is:

1. A magnetic separator for separating magnetic particles from a non-magnetic fluid, wherein the magnetic separator comprises: a separation chamber having an interior wall, an exterior wall, a top portion, a bottom portion, and an elongate portion defined between the top and bottom portions; a magnet having a first pole and a second pole positioned adjacent to the exterior wall of the separation chamber and with no magnetic elements built inside said separation chamber, wherein the first pole is substantially diametrically opposed to the second pole; a first inlet port directed into the separation chamber, wherein the first inlet port is adapted to transfer a mixture into the separation chamber wherein said inlet port comprises at least one inlet pipe within said separation chamber, said inlet pipe being adapted to sweep the mixture through the separation chamber; an underflow port in communication with the bottom portion of the separation chamber, wherein the underflow port is adapted to receive the magnetic particles; and an overflow port at the top of the separation chamber and in communication with the separation chamber, wherein the overflow port is adapted to receive the non-magnetic fluid.

2. The magnetic separator of claim 1, wherein the separation chamber is one of substantially elongate cylindrical shape or substantially parallelepipedal shape and a high gradient magnetic separator which serves as a secondary separator is positioned adjacent to and in fluid communication with the overflow port.

3. The magnetic separator of claim 1, wherein the top and bottom portions of the separation chamber extend beyond the magnet and wherein the first and second poles are positioned to direct lines of a magnetic field substantially perpendicular to the separation chamber and wherein a filter is positioned adjacent to and in fluid communication with the overflow port.

4. The magnetic separator of claim 1, wherein a cross section of the top portion of the separation chamber is greater than a cross section of the elongate portion and wherein the magnet poles extend below the bottom of a magnet frame and are curved outward to slowly increase a local magnet pole opening as one proceeds along a vertical direction down away from a bottom area of the magnet, thus lowering a strength of a magnetic field in a region of a the bottom area of the separation chamber and reducing a vertical component of the magnetic field which in turn reduces an upward directed magnetic force that tends to retain and create unwanted plugging with the magnetic particles.

5. The magnetic separator of claim 1, wherein the first inlet port directed into the separation chamber creates tangential flow entry.

6. The magnetic separator of claim 1, wherein the first inlet port directed into the separation chamber creates down-directed flow entry.

7. The magnetic separator of claim 1, wherein a demagnetization coil is positioned adjacent to and in fluid communication with the underflow port.

8. A method of conducting a separation, comprising: selecting a separation chamber having an interior wall, an exterior wall, a top portion, a bottom portion, and an elongate portion defined between the top and bottom portions; positioning a magnet having a first pole and a second pole adjacent to the exterior wall of the separation chamber and with no magnetic elements built inside said separation chamber, wherein the first pole is substantially diametrically opposed to the second pole; directing a quantity of a slurry containing magnetic particles to be separated into a first inlet port directed into the separation chamber, wherein the first inlet port is adapted to transfer a mixture into the separation chamber wherein said inlet port comprises at least one inlet pipe within said separation chamber, said inlet pipe being adapted to sweep the mixture through the separation chamber; allowing the fluid flow to move contents of the separation chamber toward an underflow port in communication with a bottom portion of the separation chamber, and separating out the magnetic particles via the underflow port, wherein the underflow port is adapted to receive the-magnetic particles; and an overflow port at the top of the separation chamber and in communication with the separation chamber, wherein the overflow port is adapted to receive non-magnetic fluid.

9. A magnetic separator for separating magnetic particles from a non-magnetic fluid, wherein the magnetic separator comprises: a separation chamber having an interior wall, an exterior wall, a top portion, a bottom portion, and an elongate portion defined between the top and bottom portions; a magnet having a first pole and a second pole positioned adjacent to the exterior wall of the separation chamber and with no magnetic elements built inside said separation chamber, wherein the first pole is substantially diametrically opposed to the second pole; a first inlet port directed into the top portion of the separation chamber, wherein the first inlet port is adapted to transfer a mixture into the separation chamber wherein said inlet port comprises at least one inlet pipe within said separation chamber, said inlet pipe being adapted to sweep the mixture through the separation chamber; an underflow port in communication with the bottom portion of the separation chamber, wherein the underflow port is adapted to receive the magnetic particles; and an overflow port at the top of the separation chamber and in communication with the separation chamber, wherein the overflow port is adapted to receive the non-magnetic fluid.

* * * * *